UNITED STATES PATENT OFFICE.

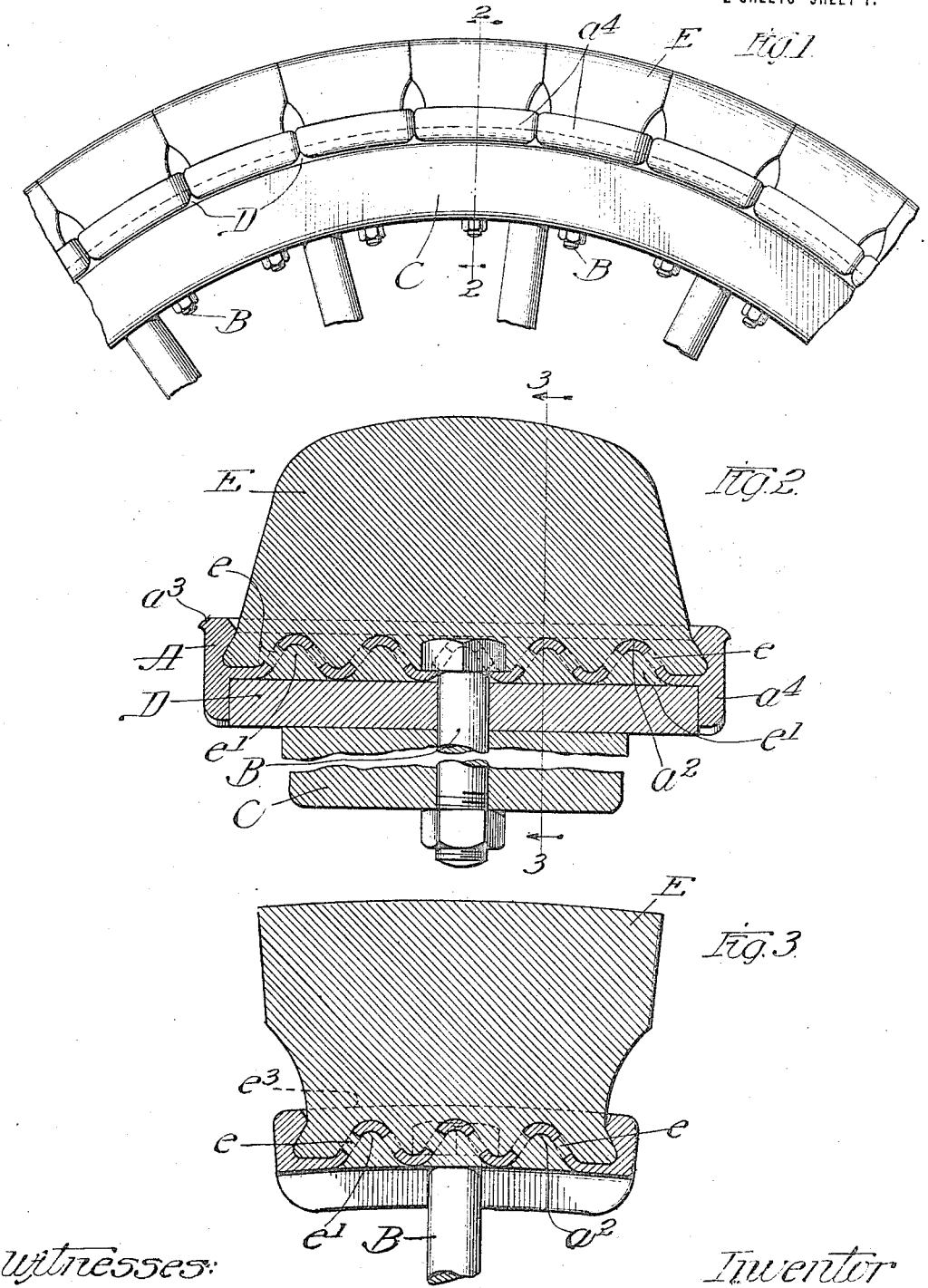

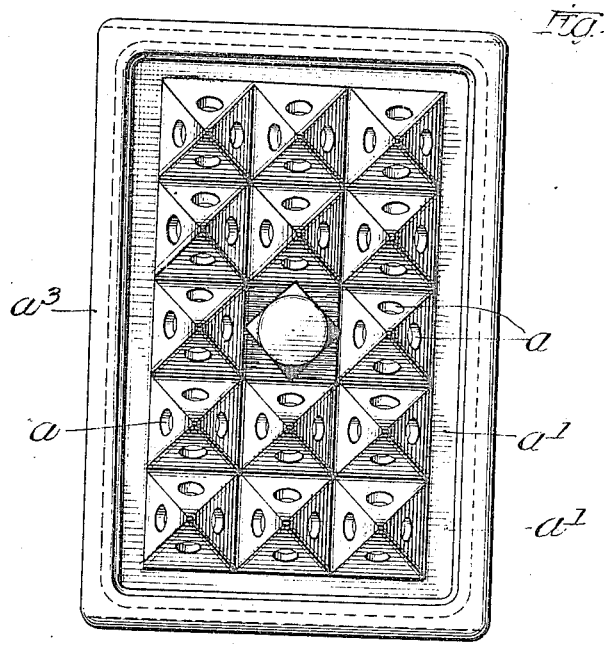
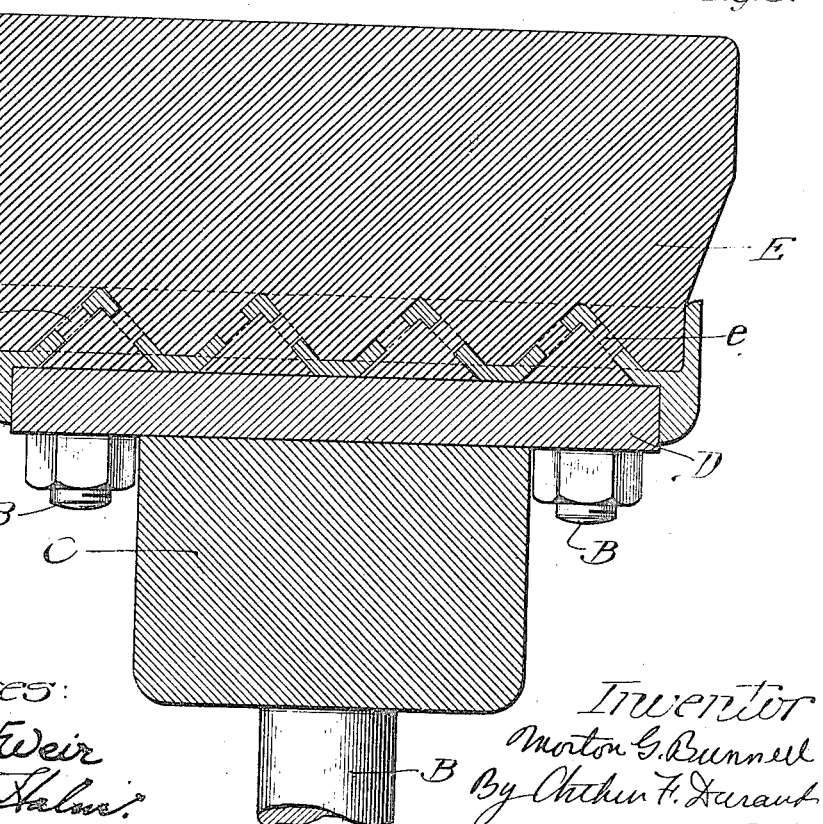

MORTON G. BUNNELL, OF CHICAGO, ILLINOIS, ASSIGNOR TO RICHARD T. WHELPLEY, OF CHICAGO, ILLINOIS.

WHEEL-TIRE.

1,232,654. Specification of Letters Patent. Patented July 10, 1917.

Application filed September 29, 1913. Serial No. 792,242.

*To all whom it may concern:*

Be it known that I, MORTON G. BUNNELL, a citizen of the United States of America, and resident of Chicago, Cook county, Illinois, have invented a certain new and useful Improvement in Wheel-Tires, of which the following is a specification.

My invention relates to rubber tires for vehicle wheels. It relates more particularly to tires of this kind which are made in sections. With this construction each section can be removed independently of the others.

Generally stated, the object of my invention is to provide a novel and effective sectional vehicle tire of the foregoing general character.

A special object is to provide novel and effective means for securing the sections of the tire to the felly of the wheel, involving plates which are perforated to anchor the base portions of the rubber sections, and which combine to form the rim of the wheel, each plate being detachable, whereby the different sections are each removable without disturbing the others.

It is also an object to provide certain details and features of construction tending to increase the general efficiency and desirability of a sectional tire of this particular character.

To the foregoing and other useful ends, my invention consists in matters hereinafter set forth and claimed.

In the accompanying drawings:

Figure 1 is a side elevation of a portion of a wheel felly and tire embodying the principles of my invention.

Fig. 2 is an enlarged cross section on line 2—2 in Fig. 1.

Fig. 3 is a section on line 3—3 in Fig. 2.

Fig. 4 is a plan of one of the sections with the rubber cushion removed to show the holes in the base or rim plate.

Fig. 5 shows another form of my invention.

Referring to Figs. 1 to 4, inclusive, my invention comprises a series of rim plates A secured by bolts B to the felly C, there being a metal band D interposed between said felly and plates. Each plate has a number of holes $a$ which extend at an angle to each other, it being observed that said plates are formed with elevations and depressions, the elevations above forming the depressions below. This is done by casting or pressing the plate to give it the desired shape, and the said holes are preferably located on the sloping sides of the elevations $a'$, whereby they communicate with the recesses $a^2$ on the underside of the plate. The plate may be provided with corrugations extending at right angles to each other, these corrugations consisting, of course, of suitably formed ridges or grooves, whereby both lateral and endwise displacement of each cushion is resisted by its allotted plate.

As shown, the corrugations extending one way are broken at intervals by the grooves of the corrugations extending crosswise thereof, thus forming pyramidal elevations; but the corrugations or ridges may have any suitable form or shape and may be arranged crosswise in any suitable manner without departing from the spirit of my invention.

The rubber cushions E are molded on the plates A, and have portions C which extend through the holes $a$ to connect with the portions C' which occupy the depressions on the underside of each plate. Thus each plate A is solidly embedded in the base of the rubber cushion thereon. Also, the plates are formed with flanges $a^3$ which embrace the cushions and assist in preventing displacement thereof. Bottom flanges $a^4$ engage the edges of the band D to hold the cushion plates in position, the bolts B being radial. Preferably, as shown, the cushions E engage each other to form a practically continuous tread.

As shown in Fig. 5 the construction is substantially the same as that previously shown and described. In this case, however, the bolts F for retaining the sections in place are inserted through the overhanging lateral portions of the band D, whereby the said bolts do not pass through the felly of the wheel. Also, the formation of the plate G is a little different, the elevations being somewhat more acute on the top than at the bottom. In addition, the rubber cushion H overhangs the sides of the rim. In each construction it will be seen, however, that the radial bolts pass through the wheel, as the annular rim member D is a part of the wheel. These bolts have their outer ends provided with heads or other retaining means vulcanized in the base of the rubber.

An important consideration of my invention is the method by which the plates A are secured to the rubber cushions E. This is preferably done by vulcanizing each plate in the base of the cushion—that is to say, the unvulcanized rubber is molded onto the plate, in a suitable manner, and then vulcanized with the plate therein. In this way, and with the construction shown, each cushion is composed of a body of vulcanized rubber, the larger portion of which is in action, when compressed between the wheel and the ground, and only a small percentage of which is dormant or not in action. In other words, there is only a comparatively small portion of the rubber between the rim plate A and the felly structure of the wheel, whereby the rubber is economically employed, practically the entire body thereof being used as a resilient cushion. The small proportion of rubber which is not in action, and which is employed merely as a means for attaching the cushion to the plate, is comparatively negligible. Hence my invention involves but only a very slight quantity of what may be called dead or dormant rubber—that is to say, rubber which does not contribute to the resiliency of the tire.

The felly structure, as explained, comprises the felly proper C and the band or rim D, the supplemental and sectional rim of the wheel being formed by the plates A in which are seated the rubber cushions. Thus any cushion can be removed without disturbing the continuity of the wheel, as the felly structure remains intact, forming a complete wheel, even when all of the cushions are removed. Each cushion is held against lateral displacement, as the strain is met at practically every angle by a plurality of shoulders—that is to say, by a plurality of the sides or faces of the pyramidal protuberances with which the face of each rim plate is provided. In this way the various strains and stresses to which a tire of this kind is ordinarily submitted, are well taken care of, the effect being a resilient wheel tire capable of withstanding considerable wear and tear, notwithstanding the sectional character thereof.

With the construction shown, the result is that each rim plate A has a plurality of elevations or suitably formed portions on the seating surface thereof, which, in effect, form rows of cups on the back of each plate, and which cups are directly against the periphery of the wheel. As the said plates are provided with openings $a$, as previously described, portions of the rubber extend through the plate and fill the said cups, it being understood that these openings can be of any suitable or desired shape or size, and of any desired number. In other words, the essential requirement, so far as this feature of my invention is concerned, is that each of said cups shall have one or more openings of such character that the rubber may extend through the plate and fill the said cups, thus securely embedding the plate in the base of the rubber cushion.

By having the elevations and depressions of the base plate formed or located on lines at right angles to each other, so that a plurality of the lines extend circumferentially of the sectional rim, and so that the other lines extend transversely of the rim, the construction not only resists circumferential creeping of the tire on the rim, but also lateral shift or displacement thereof. In addition, the openings in the base plate of each cushion coöperate with these lines to resist displacement of the sectional rubber-tire on the rim.

I do not limit myself to the exact construction and formation shown and described.

What I claim as my invention is:

1. A sectional wheel tire comprising a series of base plates forming a sectional wheel rim, attaching devices for removably securing the plates against displacement on the periphery of the wheel, and resilient cushions for said plates, disposed between the sides of said rim, forming the sectional tread of the tire, each plate having a seating surface provided with attaching means, and each cushion having said means vulcanized in the base thereof to permanently secure said tread and rim together, the opposite surfaces of each plate being provided with elevations and depressions formed by corrugations extending at right angles to each other, and each plate having openings through which portions of the cushion extend into direct contact with the wheel.

2. The structure of claim 1, said devices consisting of radial bolts connecting said plates and wheel.

3. The structure of claim 1, said devices consisting of radial bolts connecting said plates and wheel, and said bolts having their outer ends provided with retaining means held permanently in position by the base portions of said cushions.

4. A sectional wheel tire comprising a series of base plates forming a sectional wheel rim, attaching devices for removably securing the plates against displacement on the periphery of the wheel, and resilient cushions for said plates, disposed between the sides of said rim, forming the sectional tread of the tire, each plate having a seating surface provided with attaching means, and each cushion having said means vulcanized in the base thereof to permanently secure said tread and rim together, the face and back of each plate being provided with elevations and depressions formed on parallel lines, some of which lines extend circumferentially of the rim and others transversely thereof, and each plate having openings through which portions of the cushion extend into direct contact with the wheel.

5. The structure of claim 4, said devices consisting of radial bolts connecting said plates and wheel.

6. The structure of claim 4, said devices consisting of radial bolts connecting said plates and wheel, and said bolts having their outer ends provided with retaining means held permanently in position by the base portions of said cushions.

7. A sectional wheel tire comprising a series of base plates forming a sectional wheel rim, attaching devices for removably securing the plates against displacement on the periphery of the wheel, so that each plate can be removed independently of and without disturbing the others, and resilient cushions for said plates, disposed between the sides of said rim, forming the sectional tread of the tire, each plate having a seating surface provided with attaching means, and each cushion having said means vulcanized in the base thereof to permanently secure said tread and rim together, the opposite surfaces of each plate being provided with elevations and depressions formed on lines extending at right angles to each other, and each plate having openings through which portions of the cushion extend into direct contact with the wheel.

8. The structure of claim 7, said devices consisting of radial bolts connecting said plates and wheel.

9. The structure of claim 7, said devices consisting of radial bolts connecting said plates and wheel, and said bolts having their outer ends provided with retaining means held permanently in position by the base portions of said cushions.

Signed by me at Chicago, Illinois, this ninth day of September, 1913.

MORTON G. BUNNELL.

Witnesses:
RACHEL J. RICHARDSON,
ROSE E. SEHNEM.

Copies of this patent may be obtained for five cents each, by addressing the "Commissioner of Patents, Washington, D. C."